United States Patent [19]
Abeles et al.

[11] Patent Number: 5,846,641
[45] Date of Patent: Dec. 8, 1998

[54] MULTI-LAYER MEMBRANE COMPOSITES AND THEIR USE IN HYDROCARBON PARTICAL OXIDATION

[75] Inventors: Benjamin Abeles, Princeton; Richard Barry Hall, Whitehouse Station; Minyao Zhou, Somerset, all of N.J.

[73] Assignee: Exxon Research and Engineering Company, Florham Park, N.J.

[21] Appl. No.: 822,379

[22] Filed: Mar. 20, 1997

[51] Int. Cl.[6] ............ B01D 53/22; B01D 71/02; B01J 35/10; B32B 3/12
[52] U.S. Cl. ............ 428/312.8; 55/498; 55/523; 55/524; 95/54; 96/4; 96/10; 428/116; 428/310.5; 428/315.7; 428/315.9; 428/316.6; 428/319.1; 502/4; 502/300
[58] Field of Search ............ 428/116, 310.5, 428/312.8, 315.7, 315.9, 316.6, 319.1; 95/54; 96/4, 10; 55/523, 524, 498; 502/4, 300

[56] References Cited

U.S. PATENT DOCUMENTS

| | | | |
|---|---|---|---|
| 5,240,480 | 8/1993 | Thorogood et al. | 96/4 |
| 5,276,237 | 1/1994 | Mieville | 585/500 |
| 5,534,471 | 7/1996 | Carolan et al. | 502/4 |
| 5,569,633 | 10/1996 | Carolan et al. | 502/4 |
| 5,599,383 | 2/1997 | Dyer et al. | 96/8 |

OTHER PUBLICATIONS

U. Balachandran, et al., American Ceramic Society Bulletin vol. 74, pp. 71–75, 1995. Methane to Syngas via Ceramic Membranes.

T.J. Mazanec, Electropox: BP's Novel Oxidation Technology, in The Activation of Dioxygen and Homogeneous Catalytic Oxidation, Edited by D.H.R. Barton, et al., Plenum Press, New York 1993.

H.J.M. Bouwmeester, et al., Importance of the surface exchange kinetics as rate limiting step in oxygen permeation through mixed–conducting oxides, Solid State Ionics 72 (1994) 185–194.

H. Deng, et al., Solid State Ionics 74(1994) 75–84, Diffusion–reaction in mixed ionic–electronic solid oxide membranes with porous electrodes.

H. Deng, et al, Solid State Ionics 80(1995) 213–222. Transport in solid oxide porous electrodes: Effect of gas diffusion.

Primary Examiner—James J. Bell
Assistant Examiner—Blaine R. Copenheaver
Attorney, Agent, or Firm—Gerard J. Hughes

[57] ABSTRACT

The present invention discloses a mixed ionic electronic conductor membrane comprising a dense layer sandwiched between two porous layers. Furthermore the invention discloses the application of this membrane to the use of partial oxidation of hydrocarbons. One porous layer, which is in contact with air, promotes the generation of oxygen ions. The oxygen ions diffuse through the dense layer to the second porous layer which is in contact with a hydrocarbon and result in partial oxidation of the hydrocarbon.

8 Claims, 6 Drawing Sheets

(a)

(b)

Case (a)

— Dense Layer
▓▓ Porous Oxygen Catalyst/Support
▓▓ Porous Methane Catayst

Case (b)

— Dense Layer
▓▓ Porous Oxygen Catalyst/Support
▓▓ Porous Methane Catayst

MULTI-LAYER MEMBRANE COMPOSITES AND THEIR USE IN HYDROCARBON PARTICAL OXIDATION

FIELD OF THE INVENTION

The present invention relates to multilayer composites having a multicomponent metallic oxide membrane. In another embodiment, the present invention also relates to the use of the composite in a hydrocarbon partial oxidation process.

BACKGROUND OF THE INVENTION

The use of multicomponent metallic oxide membranes that are selectively permeable to oxygen has been proposed for a variety of applications. Among these applications are oxygen separation and utilization, including the separation of oxygen from air, partial oxidation of hydrocarbons to produce chemicals in high temperature or electrocatalytic reactors, and complete oxidation of hydrogen or hydrocarbons in high temperature solid-oxide fuel cells.

One type of multicomponent metallic oxide membrane is a non-porous mixed ionic conductor (MIEC) membrane. An MIEC membrane is illustrated schematically in FIG. 1. This type of membrane is useful in a process for partially oxidizing methane. In this process the MIEC membrane is used as a component of a membrane reactor. The membrane forms a barrier between two regions. One region contains a gas having oxygen molecules. A second region contains both the methane reactant and CO and hydrogen produced during the partial oxidation reaction. The CO and hydrogen produced during this reaction are frequently referred to as syngas.

The partial oxidation of methane reaction involves activating oxygen at the inlet interface of the MIEC membrane to produce $O^{2-}$ ions. The ions, each neutralized by two positive electron holes, diffuse across to the other side of the membrane where they react with the methane to produce CO and hydrogen. High oxygen selectivities, but low oxygen permeabilities, have been observed with a number of MIEC membranes operating in the temperature range used in the partial oxidation reaction. Low oxygen permeability leads to a low value of oxygen transport flux across the membrane; this in turn limits the amount of oxygen available to the partial oxidation reaction. Large surface area, high cost reactors are therefore needed for efficient partial oxidation to occur because of the low oxygen permeability.

Efforts directed towards improving oxygen permeability have focused on reducing the thickness of the MIEC membrane. Experiments show, however, that reducing the thickness beyond a critical thickness on the order of a millimeter does not result in increasing oxygen flux across the membrane. MIEC membranes of even 1 millimeter thickness have insufficient oxygen transport flux to permit their use in a practical partial oxidation reactor.

Conventional methane partial oxidation methods using fluidized bed reactors generally require pure oxygen as a feed. These methods therefore require a means of providing pure oxygen such as cyrogenic distillation of air. These methods also generally require that the oxygen be at a substantially high pressure comparable to the methane and syngas pressure which is of the order of 30 atmospheres. Expensive compressors are therefore required to achieve the necessary oxygen pressure.

Thus, there is a need for a process for partially oxidizing methane that uses air at approximately atmospheric pressure as an oxygen source, has sufficient oxygen flux to permit the construction of reactors with surface areas of practical size, and produces CO and $H_2$ at pressures high enough to be suitable for subsequent processing.

SUMARY OF THE INVENTION

The present invention is based upon the discovery that MIEC membrane thickness can be decreased beyond the critical thickness, with a corresponding oxygen transport flux increase, so long as the rate of oxygen activation and the rate of oxygen consumption are also increased.

FIG. 2 depicts an MIEC composite membrane having three regions. On the left is a porous, oxygen activation (OA) region that converts gas phase oxygen into solid-state oxygen anions, in the middle is a non-porous MIEC region that transports the oxygen anions but blocks oxygen molecules and all other gas molecules, and on the right hand side is another porous region in which gas phase methane reacts with oxygen anions to form CO and hydrogen. The thickness, porosity and reactivity of each of these regions must be chosen to optimize several factors including: gas transport within the pores on the oxygen side of the membrane, reactivity of the pore surface with oxygen, ion/electron diffusivity in the porous catalyst materials, ion/electron diffusivity in the dense region, reactivity of the pore surface with methane, and gas transport on the methane reaction side. Optimal dimensions for each of these regions are defined herein.

In one embodiment, the present invention is an MIEC membrane having attached porous catalytic regions.

Porous layers can be deposited on the nonporous layer by painting or spraying MIEC powders suspended in solution and subsequently sintering. Powders in the size range 1–3 μm are conventionally prepared by ball milling. Even finer particles can be prepared, for instance, by aerosol/freeze drying techniques.

In another embodiment, the present invention is the use of an MIEC membrane with attached porous catalytic regions in a process for partially oxidizing hydrocarbons such as methane. As described herein, such a process makes use of air at atmospheric pressure as the oxygen source, incorporates a high flux MIEC membrane, and produces CO and hydrogen at pressures sufficient to be used for subsequent processing.

DETAILED DESCRIPTION OF THE INVENTION

Increasing oxygen transport flux in the membrane can lead to a reduction in the surface area and hence a reduction in the price of membrane reactors used in methane partial oxidation processes. Oxygen transport flux in the non-porous membrane is directly related to the coefficient of bulk ambipolar diffusion of oxygen and electron holes through the membrane, $D_a$, and the coefficient for surface activation of the oxygen gas, $K_i$. The flux can be increased by reducing the thickness, L, of the dense membrane until, $L \sim L_d$, where $$L_d = D_a / K_i \quad (1)$$

The length scale $L_d$ determines the transition from diffusion limited ($L >> L_d$) to surface reaction rate limited ($L << L_d$) oxygen transport.

Figure 3:
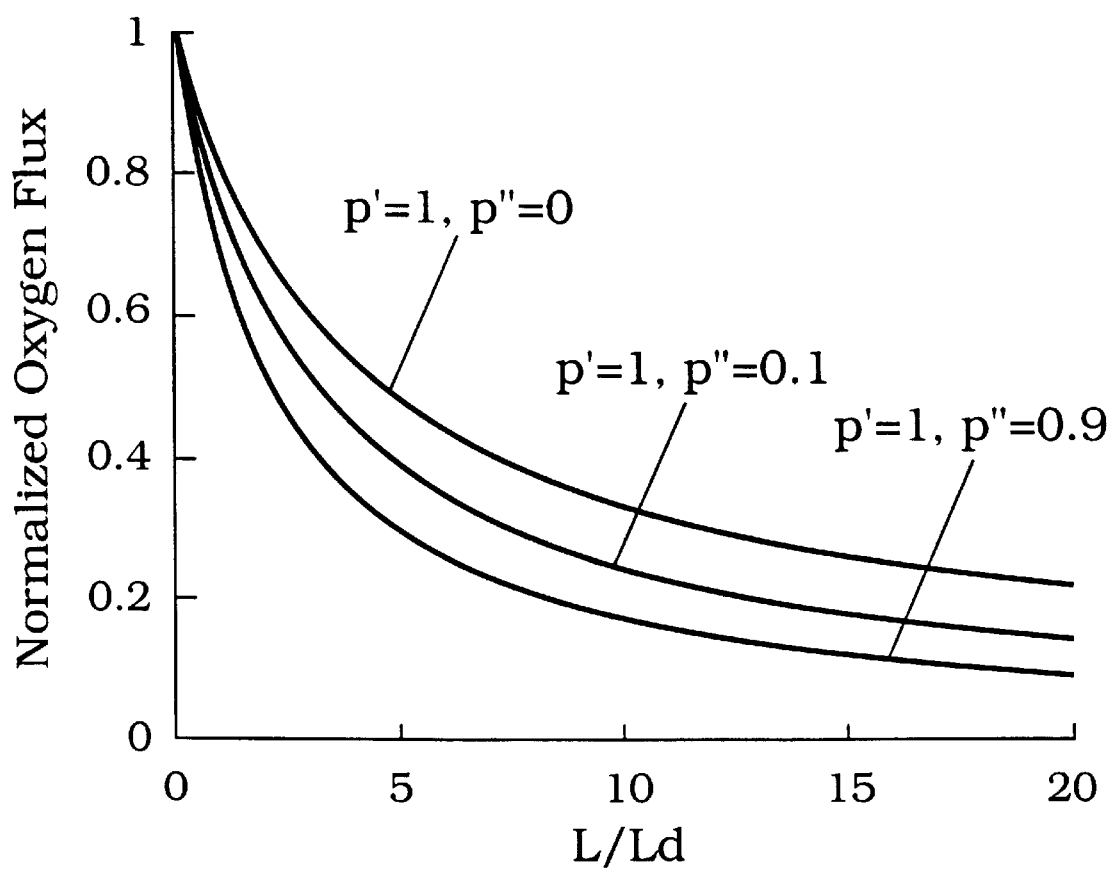
FIG. 3. The calculated dependence of normalized oxygen flux in a dense membrane on membrane thickness and on the inlet and outlet pressures p' and p".

This effect is illustrated in FIG. 3. FIG. 3 shows the calculated dependence of the oxygen flux on membrane thickness and on the inlet (p') and outlet (p") pressures. The highest net driving force for a given inlet pressure is achieved when p"=0. In practice p" is limited by the lowest oxygen pressure at which the membrane material remains stable and by the rate at which oxygen can be removed from the output side of the membrane. The flux increases linearly with 1/L for $L >> L_d$ and saturates for $L << L_d$. To achieve higher fluxes the surface reaction rate must be increased.

Figure 4:
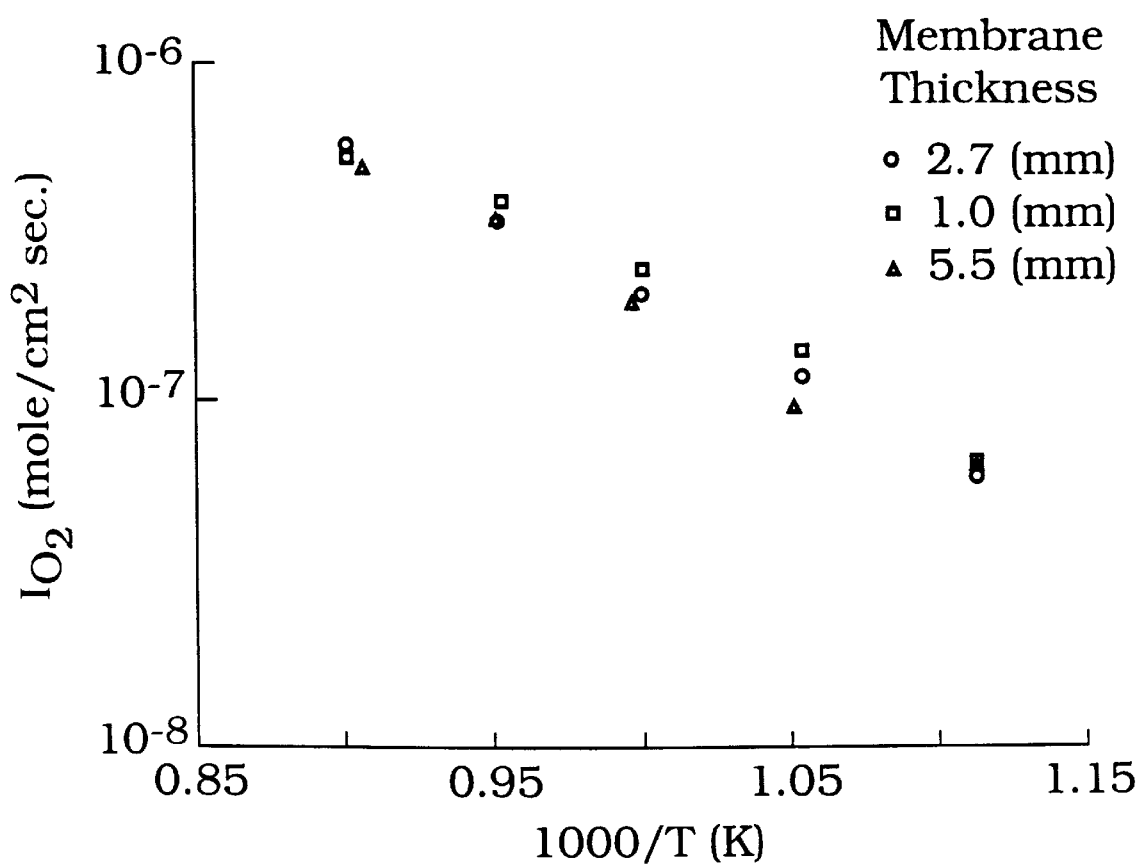
FIG. 4. Oxygen flux, $I_{O2}$, through a dense $SrCo_{0.8}Fe_{0.2}O_{3-\delta}$ membrane as a function of temperature for different membrane thicknesses.

Experimental evidence pointing to the existence of a surface reaction limit is shown in FIG. 4 for a non-porous membrane of $SrCo_{0.8}Fe_{0.2}O_{3-\delta}$, where $\delta$ ranges from about 0.3 to about 0.5 (L. Qui, T. H. Lee, L. M. Liu. Y. L. Yang, and A. J. Jacobson, in Solid State Ionics, 76,321, 1995). This material has one of the highest bulk diffusion coefficients of any MIEC membrane material. Oxygen permeability as a function of temperature for different membrane thicknesses is shown in the figure. It should be noted that although membrane thickness is reduced five fold, there is only a small increase in flux.

While membranes having the formula $SrCo_{0.8}Fe_{0.2}O_{3-\delta}$, where $\delta$ ranges from 0 to about 0.5, are used herein for illustration, the invention can be practiced with metallic oxides having the formula $AB\,O_{3-\delta}$, wherein A is Ca, Sr, Ba, Y, or La; B is Cr, Mn, Fe, Co, Ni, and Cu; and $\delta$ ranges from 0.3 to 0. A can also be a mixture of one or more of Ca, Sr, Ba, Y, and La, and B can also be a mixture of one or more of Cr, Mn, Fe, Co, Ni, and Cu.

The results shown in FIG. 4 suggest that the critical thickness, $L_d$, is on the order of one to several millimeters. Flux increases can be achieved through the use of membranes of thickness smaller than $L_d$ provided an increase in surface reaction rate accompanies the reduction in thickness.

Figure 1:
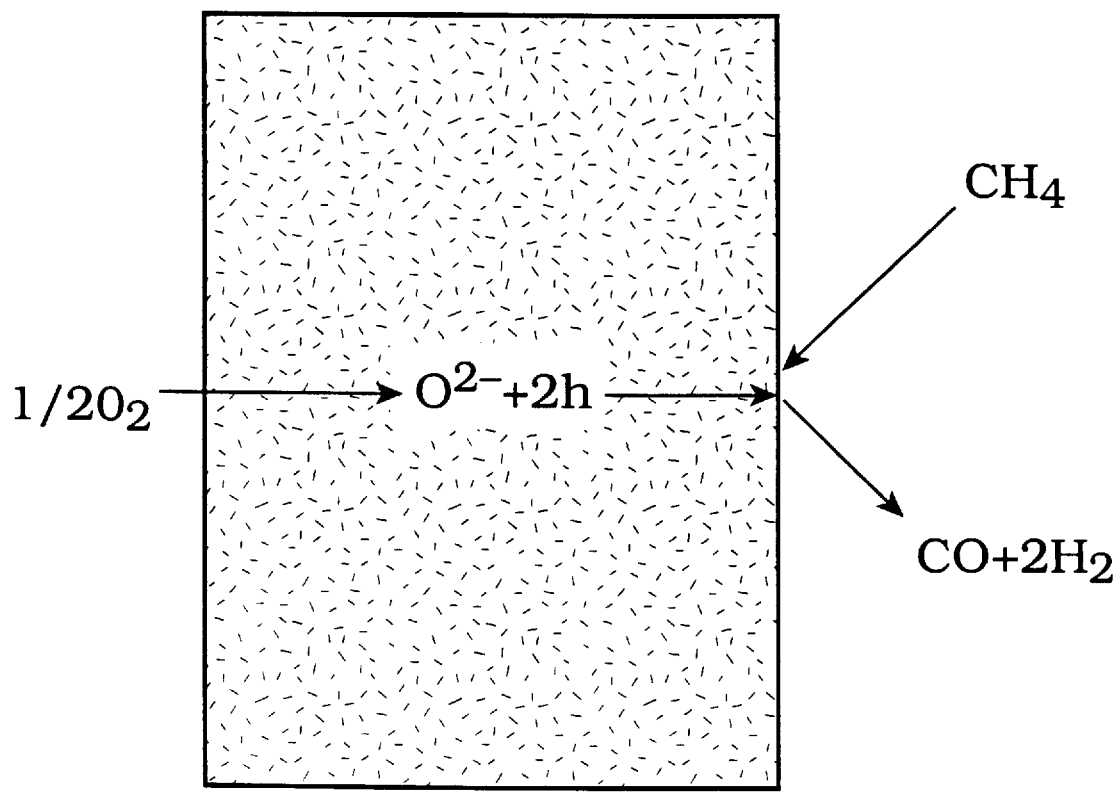
FIG. 1. A schematic of a mixed ionic electronic conductor (MIEC) dense membrane.
Figure 2:
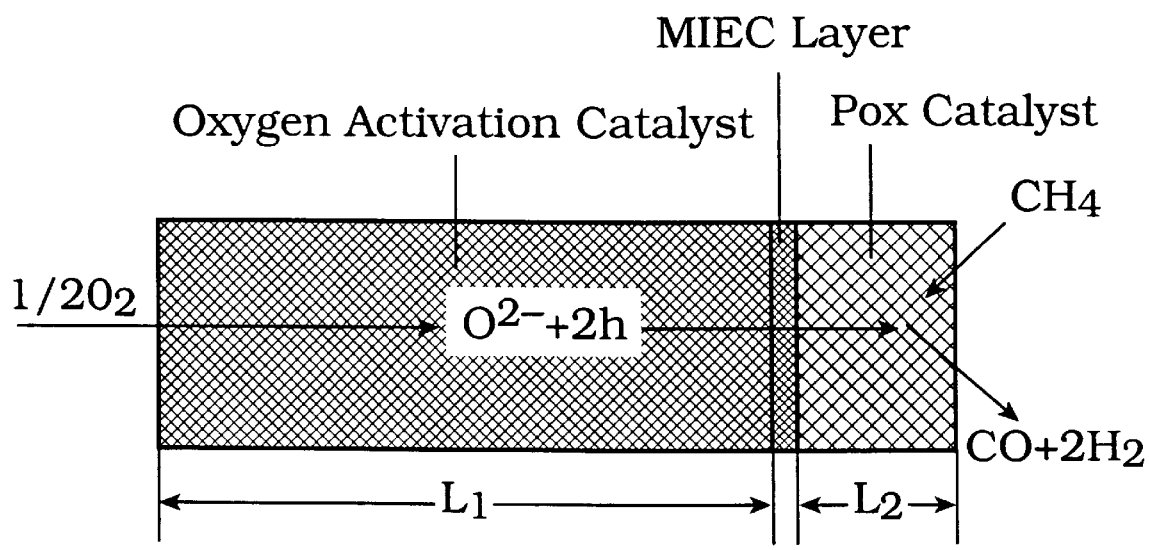
FIG. 2. A schematic diagram of a membrane reactor with porous electrodes: (a) basic membrane geometry, (b) schematic of pore structure.
Figure 2:
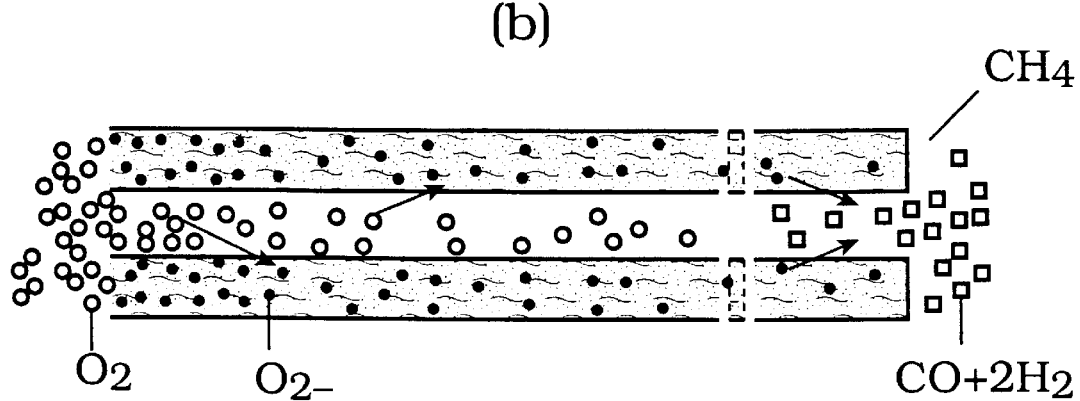

One method for increasing the reaction rate involves adding regions of highly porous catalytic materials on either side of the membrane. These porous regions provide a large effective area for reaction. This arrangement is illustrated in FIG. 2, where the three regions are shown. On the left is a porous oxygen activation (OA) region that converts gas phase oxygen into solid-state oxygen anions, in the middle is the non-porous MIEC region that transports the oxygen anions but blocks gas molecules, and on the right hand side is another porous region in which gas phase methane reacts with oxygen anions to form CO and hydrogen.

In the arrangement illustrated in FIG. 2, oxygen throughput increases when the reaction rate of $O_2$ molecules into $O_2^-$ anions increases. Increasing the diffusion rate of the anions through the membrane also increases oxygen throughput. Additionally, when the methane reaction rate is matched to the oxygen diffusion rate excessive reduction of the membrane and gas transport limitations on both the oxygen and methane reaction sides are avoided.

Consider first the oxygen activation region shown in FIG. 2. The width of this region, $L_1$, should be greater than or equal to 3Lp, where Lp is the width of the chemical reaction zone on the oxygen activation (OA) catalyst. Lp is determined from the equation $$L_P = \left[ \frac{D_a}{K_i} \frac{1-\phi}{\rho_1 S_1 \tau_1} \sqrt{\frac{p_0}{p'}} \left( -\frac{\mu(0)}{RT} \right) \right]^{\frac{1}{2}} \quad (2)$$

where $S_1$ is the surface area per unit weight of catalyst, $\rho_1$ is the density, $\Phi$ is the porosity, $\tau_1$ is the tortuosity of the porous catalyst, $K_{i1}$ is the reaction rate, $D_{a1}$ is the ambipolar diffusion. coefficient, p' is the partial oxygen pressure at the membrane inlet, $p_0$ is atmospheric pressure, $\mu(0)$ is the chemical potential at the interface of the OA catalyst with the dense layer, T is the absolute temperature, and R is the gas constant. The chemical potential $\mu(0)$ can also be expressed in terms of an effective pressure p where $p = p_o \exp(\mu(0)/RT)$.

An improvement in surface reaction rate in the OA regions leads to an increase in oxygen flux $I_{O2}$. The value of $I_{O2}$ is obtained from the equation $$IO2 = \frac{1}{4} C_i \left[ K_i D_a S_1 \rho_1 \frac{1-\phi}{\tau_1} \sqrt{\frac{p'}{p_0}} \left( -\frac{\mu(0)}{RT} \right) \right]^{\frac{1}{2}} \quad (3)$$

where $C_i$ is the oxygen anion concentration. In the derivation of Eq (3), it is assumed that the dense layer. is thin enough so that the pressure drop accross it is negligible.

Table 1 lists the values of Lp and of the enhanced oxygen flux $I_{O2}$ calculated from Eqs. (2) and (3). The oxygen inlet partial pressure p'=0.2 atm (1 atm air), and $p=10^{-2}$ atm. The table includes a range of values for $K_i$ and $L_d$ that are characteristic of MIEC materials. The table also contains values of $S_1$ that can be partially realized in porous catalysts. The values $\Phi_1=0.3$, $\tau_1=1$, $\rho=_1=3.7$ g/cm$^3$ and $C_1=0.083$ moles/cm$^3$ were used throughout as representative values for well consolidated porous catalysts. Also given in the table is the enhancement factor $\eta$ which is the ratio of the enhanced oxygen flux to the flux $I^{(s)}{}_{O2}$ achieved using only the dense layer to activate the oxygen, where $$I_{O2}^{(s)} = \frac{1}{4} C K_i \left( \sqrt{\frac{p'}{p_0}} - \exp\frac{\mu(0)}{RT} \right) \quad (4)$$

and where $\mu(0)/RT = -4.6$ which corresponds to an effective pressure of $p=10^{-2}$ ATM.

TABLE 1

| $S_1$ m$^2$/gm | $K_i$ cm/sec | $D_a$ cm$^2$/sec | $L_p$ $\mu$m | $I_{O2}$ $\mu$mol/cm$^2$s | $\eta$ |
|---|---|---|---|---|---|
| 100 | $5 \times 10^{-5}$ | $5 \times 10^{-8}$ | 0.44 | 76 | 170 |
| 1 | $5 \times 10^{-5}$ | $5 \times 10^{-8}$ | 4.4 | 7.6 | 17 |
| 100 | $5 \times 10^{-5}$ | $5 \times 10^{-6}$ | 4.4 | 760 | 1700 |
| 1 | $5 \times 10^{-5}$ | $5 \times 10^{-6}$ | 44 | 76 | 170 |
| 100 | $5 \times 10^{-7}$ | $5 \times 10^{-10}$ | 0.44 | 0.76 | 170 |
| 100 | $5 \times 10^{-7}$ | $5 \times 10^{-8}$ | 4.4 | 7.6 | 1700 |

The enhancements shown in Table 1 range from about 17 to about 1,700. This implies that oxygen fluxes in excess of 100 $\mu$mol/cm$^2$ sec can be achieved in MIEC membranes having an adjacent porous OA catalyst region. This compares favorably with a 1 mm thick dense MIEC membrane without a catalyst layer. Such a membrane would only have a flux in the range of approximately 0.005 to 0.5 $\mu$mol/cm$^2$ sec when used under identical operating conditions.

As noted above, the thickness of the OA catalyst layer, $L_1$, must be greater than or equal to 3 Lp. Additionally, the surface area of the porous OA layer should be in the range of about 1 to about 100 m$^2$/gram. The thickness $L_1$ should therefore be in the range of approximately 1 to 100 microns, and the catalyst particles should range in size from about 50 Å to about 0.5 microns in size so that sufficient surface area exists within the thickness $L_1$. The dense layer's thickness should be much an $2L_d/\eta$ in order for the pressure drop over the dense layer to be negligible.

An additional consideration in maximizing oxygen throughput is the matching of oxygen flux $I_{O2}$ to the rate of the methane partial oxidation (POX) reaction ($K_g$). This is accomplished by adjusting the POX catalyst layer thickness ($L_2$), the POX catalyst surface area $S_2$, and $K_g$, according to the relationship $$I_{O2} = \frac{p_2}{2RT} Kg[1 - \phi_2 + L_2 S_2 p_2] \quad (5)$$

where $P_2$ is the methane pressure.

Table 2 lists the value of $L_2 S_2 \rho_2$ for the case where $I_{O2}$=100 $\mu$mol/cm$^2$. The range of values for $L_2 S_2 \rho_2$ given in Table 2 fixes the POX catalyst film thickness and particle size to the ranges of 0.1 to 100 microns and 0.1 to 10 microns respectively. The value of $K_g$ is fixed at 0.15 cm/sec in the table. However, $K_i$ and $K_g$ are in general related according to $K_g/K_i \sim c_i/c_g$, where $c_g$ is the concentration of methane gas molecules. Additionally, the exact value of $K_g$ will depend on the POX catalytic activity.

TABLE 2

| p(atm) | $L_2 S_2 \rho_2$ |
|--------|------------------|
| 30     | 3.2              |
| 1      | 117              |

Figure 5:
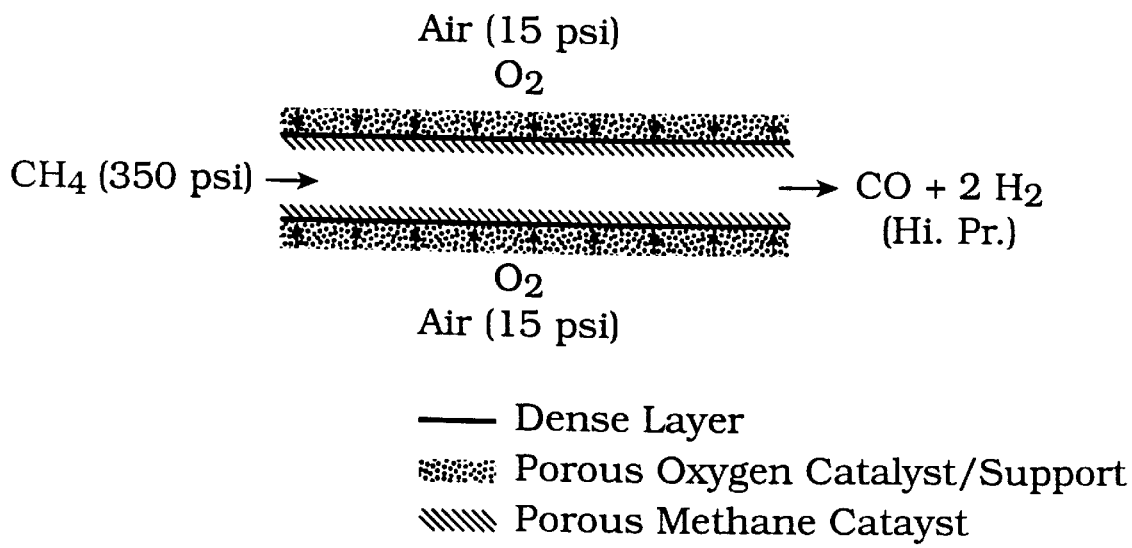
FIG. 5. A tubular membrane reactor. Air is supplied at uniform pressure at the outer surface of the tube and methane and the product syngas flow axially inside the tube. The catalyst layer on the interior surface of the tube, is (a) uniform and (b) graded.
Figure 5:
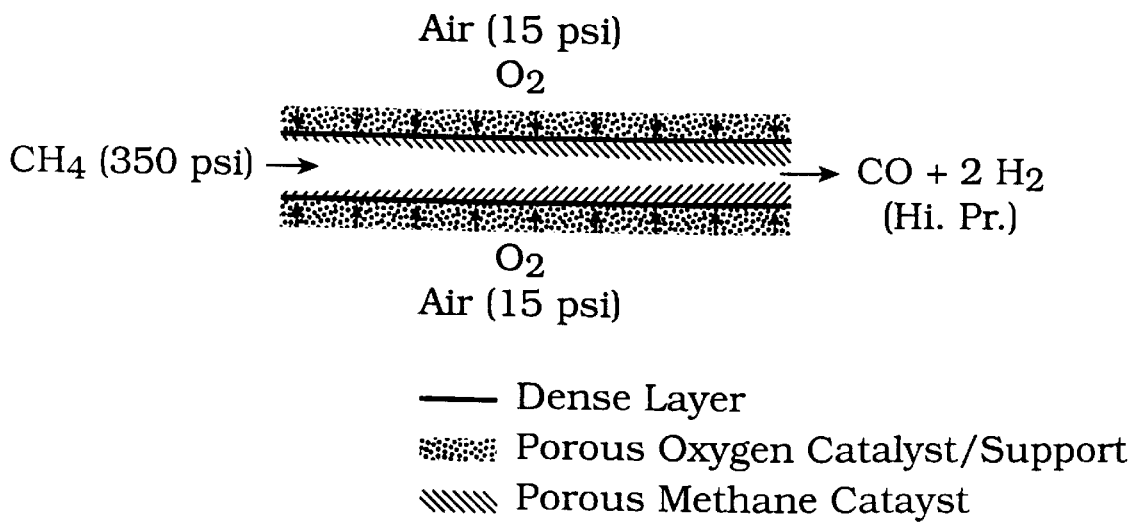

Although the description of the invention referred to the planar geometry depicted in FIG. 2, the invention is not to be construed as being limited to that geometry. For example, the invention can also be practiced when the reactor is arranged in a tubular geometry, as shown in FIG. 5. In the arrangement of FIG. 5, air is supplied at uniform pressure at the outer surface of the tube and methane and the product syngas flow axially inside the tube. The methane partial pressure $p_2$ will decrease along the direction of flow because methane is consumed in the POX reaction. Two configurations of this arrangement will be considered: case (a) where the POX catalyst thickness is uniform, and case (b) where the thickness of the POX catalyst is axially graded, so that the rate of syngas generation is uniform and equal to its value at the tube inlet. Configuration (b) permits compensation for the decrease in $p_2$ due to consumption of methane along the direction of flow.

Figure 6:
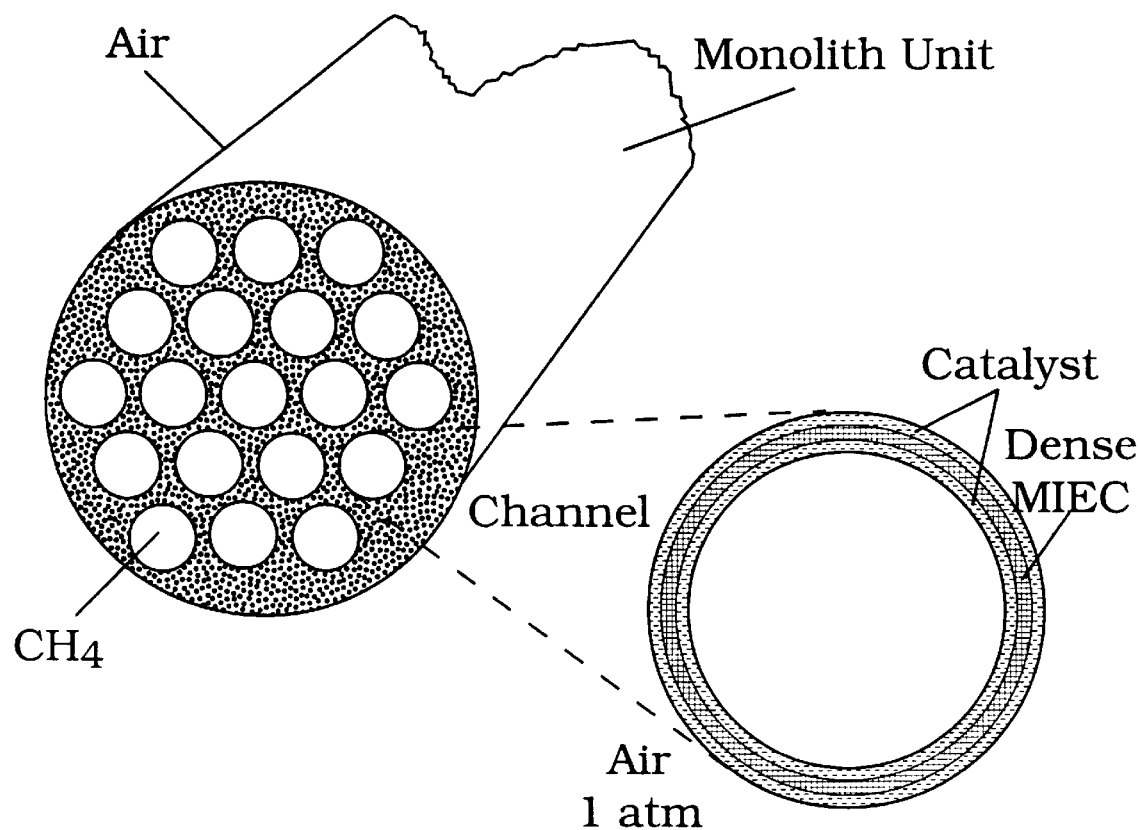
FIG. 6. A monolithic reactor in the form of a porous cylinder with an array of axial channels coated with the membrane. The outside of the cylinder is exposed to air; methane and syngas flow axially in the channels.

Still another arrangement in which the invention can be practiced is shown in FIG. 6. FIG. 6 shows an array of axial channels coated with the membrane in a porous cylinder of radius R and length (l). Air is introduced uniformly to the outside of the porous cylinder because the pores of the cylinder are sufficiently coarse there so as not to impede the radial flow of air to the channels.

For illustration, we have calculated the case of a tube with l=100 cm and radius a=0.1 cm, these being typical dimensions for channels in commercial monoliths. For $I_{O2}$ we assumed a radial flow of 50 $\mu$mol/cm$^2$s at the inlet of the tube, which is on the low side of the oxygen flux predicted by our model. The axial flows of methane (inlet) and syngas (outlet) are expressed in moles per unit cross sectional area of the tube. We have assumed that 10% of the methane remains unconverted at the outlet of the tube. The results of the calculation are given for both uniform and graded catalyst layer thicknesses in Table 3. Included in the table is the output for a monolith with a diameter of 15 cm having 16 channels/cm$^2$ (channel fill factor of 0.5). We note that the graded POX catalyst yields about 3.5× larger syngas output than the uniform POX catalyst.

TABLE 3

Performance of Tubular Reactors

|  | UNIFORM | GRADED |
|---|---|---|
| Inlet: Methane(mol/cm$^2$sec) | 0.075 | 0.27 |
| Outlet: Syngas(mol/cm$^2$sec) | 0.17 | 0.60 |
| Monolith (mol/day) | 1.3 × 10$^6$ | 4.6 × 10$^6$ |

Table 3 can be used to estimate the size of a monolith assembly for a gas conversion plant with an output of 50,000 barrels of oil/day or the equivalent of 5×10$^8$ mol/day of methane. This could be accomplished with 385 monoliths having a net volume of 3.4 m$^3$ in the case of a uniform POX catalyst while in the case of the graded catalyst the number of monoliths would be 108 and their net volume 1.9 m$^3$. We have assumed that to produce 1 barrel of oil requires 5,000 mol of oxygen. This is a significant reduction in size and therefore cost relative to existing membrane reactors.

The invention is also compatible with a number of other process modifications and innovations that under certain conditions will result in further improvement in the performance of the reactor. For example, steam may be added to the methane feed so that both POX and steam reforming (SR) of methane are performed simultaneously in the same channel. This improvement will result in the production of syngas with a higher ratio of $H_2$ to CO, and will contribute to internal heat balance in the reactor by using heat from the exothermic POX reaction to drive the endothermic steam reforming reaction.

In cases where the POX catalyst would be adversely affected by the addition of steam, as well as in cases where a different catalyst is needed for steam reforming, methane and steam may be fed into separate channels of a monolith or multiple tube reactor wherein the heat from the POX channel can be transferred to the SR without exposing the POX catalyst to steam. Optimum values for the size, number and placement of the separate channels can be defined based on heat conduction, oxygen fluxes, and space velocities of the two reactions.

The invention can also be applied to processes such as the oxidative coupling of methane (and air) to produce ethylene, the production of nitric acid from ammonia (and air), among other partial oxidation reactions that require high temperature. Any of these reactions, provided it is exothermic, may be conveniently combined with an endothermic reaction, such as steam reforming, to provide improved utilization of reaction heats.

What is claimed is:

1. A composite comprising:
   (a) a porous layer having average pore size in the range of about 50 to 50,000 Å, a thickness in the range of about 1 micron to about 100 microns, and a surface area in the range of about 0.1 to 100 square meters per gram, and consisting essentially of an oxygen activation catalyst, (b) a nonporous multi component metallic oxide membrane layer having a first surface and a second surface, the first surface being in contact with the porous layer, and the membrane layer ranging in thickness from about 1 to about 1,000 microns, and (c) a second porous layer contacting the second surface of the membrane layer and having a thickness in the range of about 0.1 to about 100 microns, a surface area in the range of about 0.1 to about 100 square meters per gram, and consisting essentially of hydrocarbon partial oxidation catalyst.

2. The composite according to claim 1 wherein the porous layer, membrane layer, and second porous layer are flat.

3. The composite according to claim 1 wherein the porous layer, dense layer, and second porous layer are concentric cylindrical layers.

4. The composite according to claim 3 wherein at least one of the porous layer, second porous layer, and dense layer varies axially in thickness.

5. A membrane comprising the composite of claim 1 in the form of a honeycomb.

6. The composition of claim 1 wherein the metallic oxide has the formula $ABO_{3-\delta}$, wherein A is one or more of Ca, Sr, Ba, Y, and La, and B is one or more of Cr, Mn, Fe, Co, Ni, and Cu, and $\delta$ ranges from 0 to 0.5.

7. The metallic oxide of claim 6 wherein A is Sr and B consists essentially of Co and Fe.

8. In a process for partially oxidizing hydrocarbons wherein oxygen molecules contact a first face of a dense mixed electronic ionic conductor having a thickness ranging from about 1 to about 1,000 microns, oxygen anions are transported across the dense mixed electronic ionic conductor at a flux to a second face in contact with hydrocarbon molecules, the oxygen anions are reacted with the hydrocarbon molecules thereby forming a product comprising carbon monoxide and hydrogen, and and wherein the rate of carbon monoxide and hydrogen formation is limited by the flux, the improvement of providing the first surface ofthe dense mixed electronic ionic conductor with a first porous layer consisting essentially of oxygen activation catalyst wherein the thickness ranges from about 0.1 micron to about 100 microns, wherein the surface area ranges from about 0.1 to about 100 square meters per gram, and wherein the oxygen molecules are converted into oxygen anions at an oxygen activation rate, providing the second surface of the dense mixed electronic ionic conductor with a second porous layer consisting essentially of partial oxidation catalyst wherein the thickness ranges from about 0.1 to about 100 microns, wherein the surface area ranges from about 0.1 to about 100 square meters per gram, and wherein the hydrocarbon molecules are reacted with oxygen anions thereby forming a product comprising CO and hydrogen at a reaction rate, and adjusting one or more of the oxygen activation rate, the dense mixed electronic ionic conductor thickness, and the reaction rate thereby causing the rate of oxygen anion production in the first layer to equal the rate of oxygen anion consumption in the second layer and increasing the flux and the rate of carbon monoxide and hydrogen formation.

* * * * *